UNITED STATES PATENT OFFICE.

ORAZIO LUGO, OF NEW YORK, N. Y.

IMPROVED FERTILIZER.

Specification forming part of Letters Patent No. 50,940, dated November 14, 1865.

*To all whom it may concern:*

Be it known that I, ORAZIO LUGO, of the city, county, and State of New York, have invented a new and Improved Fertilizer; and I do hereby declare that the following is a full, clear, and exact statement of its nature and the mode of manufacturing it.

The fertilizer is made from old and new leather by first saturating it with sulphuric acid or a solution thereof, then boiling it in water, afterward drying and grinding, and, finally, adding urate of ammonia and again drying.

The process of manufacture is as follows: The leather having been cut into small scraps or pieces, if not obtained by the manufacturer in that condition, is immersed in sulphuric acid or a solution of the same of a strength not less than one part, by weight, of acid to three of water, and allowed to remain for about forty minutes, more or less, when the acid is strained off and the leather boiled in an open pan or vessel with enough water to cover it, until the whole of said water is evaporated. Then, while still warm, the leather is ground to powder in any suitable mill. It is afterward washed in water and thoroughly dried, then saturated with a mixture of about ninety-five (95) parts, by weight, of urine and five (5) parts aqua ammonia, and again dried, when it is ready for use in the same way as bone-dust or poudrette, or any pulverulent fertilizer.

I will remark that the water in which the leather is boiled after treatment with sulphuric acid may with advantage have dissolved in it a small quantity of sulphate or oxide of iron, or have a few scraps of metallic iron thrown into it.

What I claim as my invention, and desire to secure by Letters Patent, is—

The fertilizer herein described, consisting of leather treated with sulphuric or other acids, boiled, ground, and afterward treated with urate of ammonia, substantially as herein specified.

ORAZIO LUGO.

Witnesses:
M. X. HARMONY,
EDM. F. BROWN.